US010579449B1

(12) United States Patent
Dinh et al.

(10) Patent No.: US 10,579,449 B1
(45) Date of Patent: Mar. 3, 2020

(54) MESSAGE QUEUE ARCHITECTURES FRAMEWORK CONVERTER

(71) Applicant: Dell Products L. P., Round Rock, TX (US)

(72) Inventors: Hung T. Dinh, Austin, TX (US); Vinod Kumar, Bangalore (IN); Panguluru Vijaya Sekhar, Bangalore (IN); Vinay Sathyanarayana, Bangalore (IN); Abhijit Mishra, Bangalore (IN); Satish Ranjan Das, Round Rock, TX (US); Nagireddy Bonthu, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/179,386

(22) Filed: Nov. 2, 2018

(51) Int. Cl.
  *G06F 9/54* (2006.01)
  *H04L 29/08* (2006.01)
  *G06F 9/445* (2018.01)

(52) U.S. Cl.
  CPC .......... *G06F 9/546* (2013.01); *G06F 9/44505* (2013.01); *G06F 9/541* (2013.01);
  (Continued)

(58) Field of Classification Search
  CPC ...................................................... G06F 9/546
  (Continued)

(56) References Cited

U.S. PATENT DOCUMENTS

| 7,350,212 | B2* | 3/2008 | Lambert | G06F 9/546 |
| | | | | 707/999.01 |
| 7,856,461 | B2* | 12/2010 | Venkatesan | G06F 16/27 |
| | | | | 707/960 |

(Continued)

OTHER PUBLICATIONS

Anya, Charles E., U.S. Patent and Trademark Office, Final Office Action dated Apr. 23, 2019 for U.S. Appl. No. 15/803,164, 29 pages.

(Continued)

*Primary Examiner* — Andy Ho
(74) *Attorney, Agent, or Firm* — Campbell Stephenson LLP; Shiv S. Naimpally

(57) ABSTRACT

Methods, information handling systems and computer readable media are disclosed for automatically converting from one message queue service to another. In one embodiment, a method includes receiving identification of an application program, a current message queue service employed by the application program, and a target message queue service to be employed by the application program instead of the current message queue service. The method embodiment further includes identifying current message queue object instances for the application program and mapping identifiers of the current message queue object instances to identifiers of target message queue object instances for use with the target message queue service. The embodiment continues with generating instructions for creation of the target message queue object instances by the target message queue service, and, in response to receiving a request for execution of the generated instructions, submitting the generated instructions to a message queue program implementing the target message queue service.

20 Claims, 6 Drawing Sheets

(52) U.S. Cl.
CPC ............ *G06F 9/548* (2013.01); *H04L 67/306* (2013.01); *H04L 67/34* (2013.01); *G06F 2209/547* (2013.01); *G06F 2209/548* (2013.01)

(58) Field of Classification Search
USPC .................................................. 719/313, 314
See application file for complete search history.

(56) References Cited

U.S. PATENT DOCUMENTS

| | | | |
|---|---|---|---|
| 8,510,473 B1 * | 8/2013 | Leonard .............. | H04L 67/2823 709/232 |
| 10,356,222 B2 * | 7/2019 | Ghosh ........................ | G06F 9/46 |
| 2002/0087507 A1 | 7/2002 | Hopewell et al. | |
| 2003/0225876 A1 | 12/2003 | Oliver et al. | |
| 2005/0055439 A1 | 3/2005 | Piccirilli et al. | |
| 2008/0222255 A1 | 9/2008 | Hall | |
| 2010/0115041 A1 | 5/2010 | Hawkins et al. | |
| 2014/0229480 A1 | 8/2014 | Buxbaum et al. | |
| 2015/0310401 A1 | 10/2015 | Siracusa | |
| 2015/0381709 A1 | 12/2015 | Word | |
| 2016/0182328 A1 | 6/2016 | Bhasin et al. | |
| 2017/0180220 A1 | 6/2017 | Leckey et al. | |
| 2018/0314407 A1 | 11/2018 | Dinh et al. | |
| 2018/0324118 A1 | 11/2018 | Dinh et al. | |
| 2018/0365308 A1 | 12/2018 | Kondo et al. | |

OTHER PUBLICATIONS

Anya, Charles E., U.S. Patent and Trademark Office, Non-Final Office Action dated Dec. 31, 2018 for U.S. Appl. No. 15/803,164, 26 pages.

Dinh, Hung et al., U.S. Appl. No. 15/803,164, filed Nov. 3, 2017; entitled "Optimization of Message Oriented Middleware Monitoring in Heterogenenous Computing Environments"; consisting of Specification, Claims, Abstract, and Drawings; 41 pages.

Fikry, Sally et al., "Integrate IBM Integration Bus with your Messaging Solution Using the Connector Framework", Published on Nov. 23, 2017; 15 pages.

Hashimoto, Mitchell, "HashiCorp Terraform", Jul. 28, 2014; 5 pages.

Anya, Charles E., U.S. Patent and Trademark Office, Non-Final Office Action dated Jun. 13, 2019 for U.S. Appl. No. 15/803,164, 26 pages.

* cited by examiner

MESSAGE QUEUE ARCHITECTURES FRAMEWORK CONVERTER

BACKGROUND

The present disclosure relates generally to networked information handling systems, and more particularly to automated conversion of message queue services for application programs.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be used to provide a message queue system that allows applications running on computing devices to communicate with one another. A message queue system uses a message-oriented middleware, including a software and/or hardware infrastructure that supports the sending and receiving of messages between components of distributed systems. The message oriented middleware (also called a "message queue service" herein) provides, in one embodiment, a message queue manager that manages a message queue storing messages received from a sender application running on one computing device until a receiver application running on another computing device retrieves those messages for processing. As such, message queue systems can provide asynchronous messaging between multiple sender applications and receiver applications.

Like other types of application program, message queue services are made available from multiple providers, and include both proprietary and open-source solutions. The different message queue services use different command formats from one another, and define queues and other objects using different formats and properties. The distributed applications, or systems of interrelated applications, that employ message oriented middleware are often custom applications developed in-house at large organizations, or "enterprises." Mergers and acquisitions among such enterprises can require that applications designed for different message queue services be made to work together. An enterprise may also wish to change the message queue service it uses for reasons of performance and/or cost. Converting applications across an enterprise from one message queue service to another can require a prohibitive investment of developer time.

SUMMARY

Methods, information handling systems and computer readable media are disclosed for automatically converting from one message queue service to another. According to one embodiment, a method includes receiving identification of an application program, identification of a current message queue service employed by the application program, and identification of a target message queue service to be employed by the application program instead of the current message queue service. The method embodiment further includes identifying current message queue object instances for the application program and mapping identifiers of the current message queue object instances to identifiers of target message queue object instances for use with the target message queue service. The embodiment continues with generating instructions for creation of the target message queue object instances by the target message queue service, and, in response to receiving a request for execution of the generated instructions, submitting the generated instructions to a message queue program implementing the target message queue service.

BRIEF DESCRIPTION OF THE DRAWINGS

The present disclosure may be better understood, and its numerous objects, features and advantages made apparent to those skilled in the art by referencing the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Figure 1:
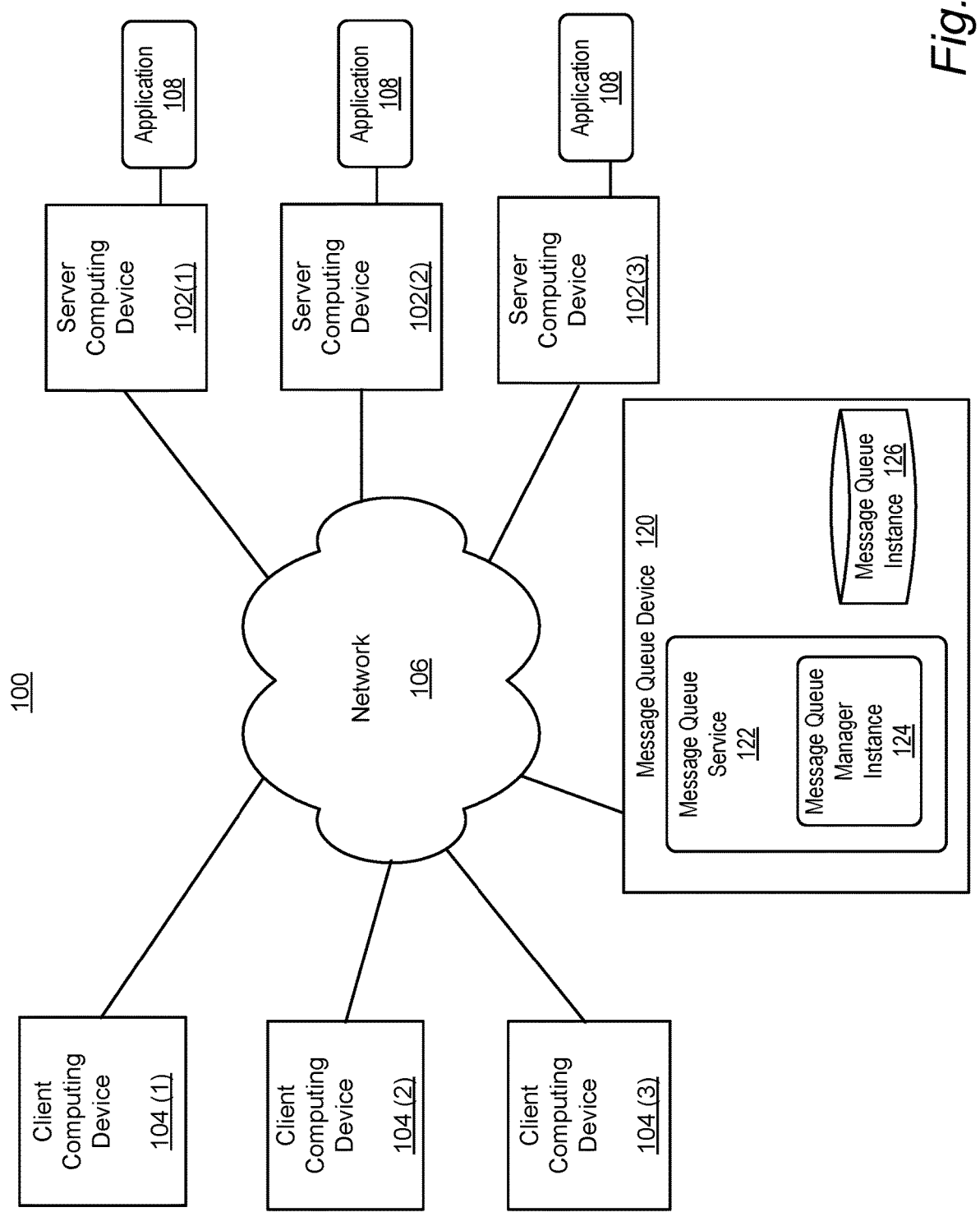
FIG. 1 illustrates an embodiment of a network environment including a message queue service.

A network environment 100 including multiple networked information handling systems is shown in FIG. 1. In the embodiment of FIG. 1, server computing devices 102 (1)-(3), client computing devices 104(1)-(3), and message queue device 120 are communicatively coupled to one another via network 106. Server computing devices 102(1)-(3), client computing devices 104(1)-(3), and message queue device 120 are embodiments of an information handling system as described above, and may take any of the various forms described, including personal computers, tablet computers, smartphones, or servers, as appropriate. Network 106 includes one or more networks suitable for data transmission, which may include local area networks (LANs), wide area networks (WANs), storage area networks (SANs), the Internet, or combinations of these. In an embodiment, network 106 includes a publicly accessible network, such as a public switched telephone network (PSTN), a DSL connection, a cable modem connection or large bandwidth trunks (e.g., communications channels providing T1 or OC3 service). Such networks may also include cellular or mobile telephone networks and other wireless networks such as those compliant with the IEEE 802.11 standards.

Server computing devices 102(1)-(3) execute applications including application 108. In an embodiment, application 108 is a distributed application for which instances of the application running on separate computing devices communicate with one another using a message queue service. Application 108 may also interact with other applications (not shown) using a message queue service in some embodiments. A large commercial enterprise may have client and server devices running applications for multiple interrelated functions, such as order management, order fulfillment, manufacturing, shipping, and support. Applications for each of these functions may interact with applications for one or more of the other functions using a message queue service. Client computing devices 104(1)-(3) execute local applications (not shown) and may also access, via network 106, applications such as application 108 running on server computing devices 102.

Network environment 100 also includes a message queue device 120 communicatively coupled to server computing devices 102 and client computing devices 104 via network 106. Message queue device 120 executes one or more message oriented middleware applications for providing a message queue service 122. In the embodiment of FIG. 1, message queue service 122 implements one or more message queue manager instances 124. A message queue manager instance 124 manages receipt of and access to messages in a message queue instance 126 by applications running on server devices 102(1)-(3) and/or client devices 104(1)-(3). A message queue manager instance as used herein is a concrete occurrence of a message queue object made available by message queue service 122. Similarly, a message queue instance is a concrete occurrence of a message queue object made available by message queue service 122. As discussed further below, an object such as a message queue or message queue manager implemented in one message queue service has distinct properties as compared with the same objects implemented in a different message queue service. An application program utilizing a message queue service accesses specific instances of the objects implemented by the message queue service. In the case of certain message queue objects, such as message queues themselves, each instance of the object has a specific name or identifier.

Alternatives and variations to network environment 100 will be recognized by one of ordinary skill in the art in view of this disclosure. In the embodiment of FIG. 1, for example, message queue device 120 is shown as separate from server computing devices 102 and client computing devices 104. The components and functionality of message queue device 120 may in other embodiments be provided using other computing devices, such as server computing devices 102 or client computing devices 104. It will also be recognized by one of ordinary skill that instances of message queue service 122 may be implemented on multiple message queue devices in some embodiments, and may be included in message queue topologies including but not limited to cluster message queue topologies or point-to-point message queue topologies. As discussed further below, different message queue objects are used by different message queue services. As an example, message queue manager instance 124 may not be included in message queue service 122 in some embodiments of a message queue device.

Figure 2:
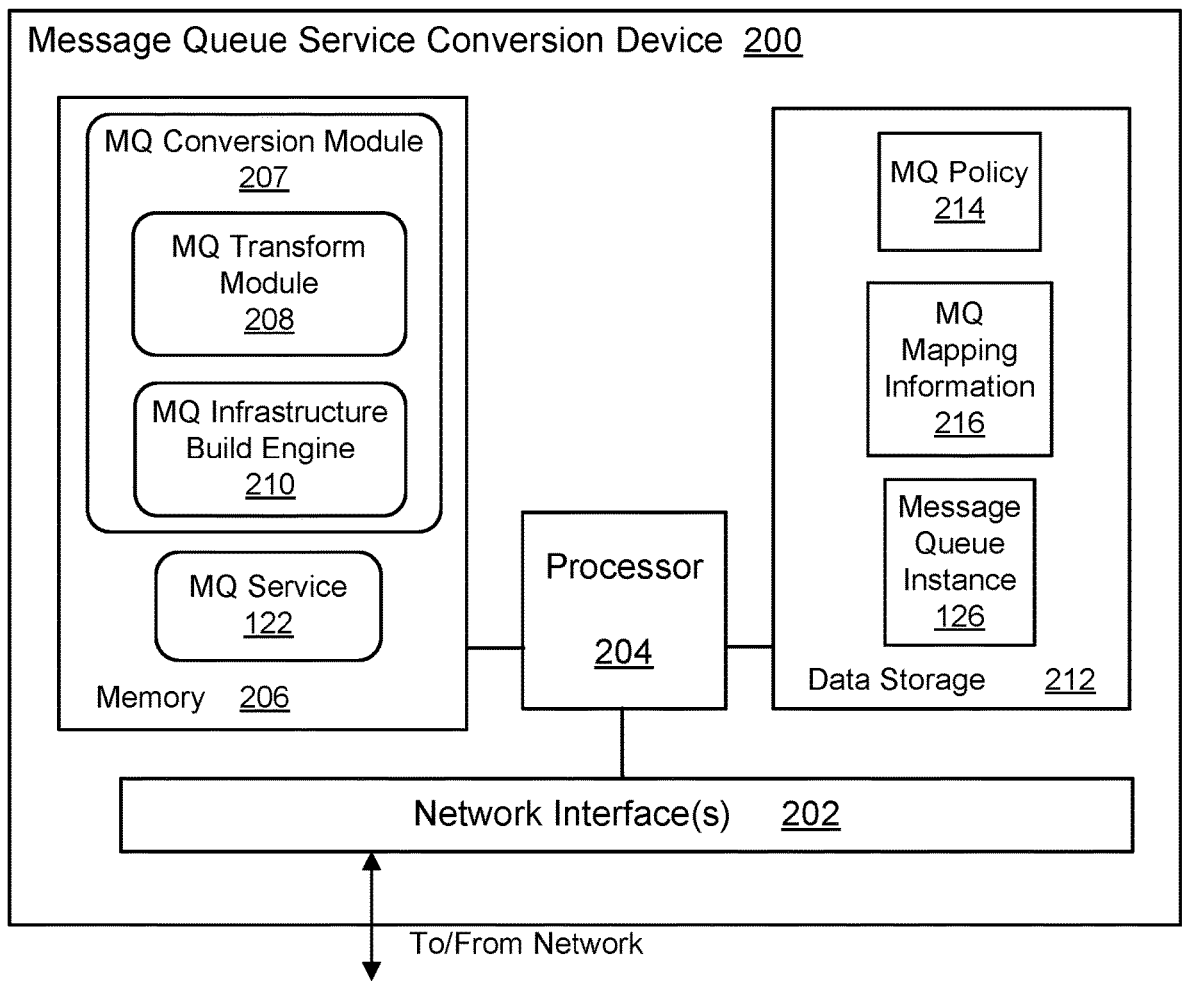
FIG. 2 is a block diagram illustrating an embodiment of a message queue service conversion device.

A block diagram illustrating certain components of an embodiment of message queue service conversion device 200 is shown in FIG. 2. Conversion device 200 is an embodiment of an information handling system as described elsewhere in this disclosure, and is configured to set up message queue infrastructure for a different message queue service (also described herein as a "target message queue service") than a message queue service currently used for an application program. In the embodiment of FIG. 2, message queue service conversion device 200 includes one or more network interfaces 202, a processor 204, memory 206 and data storage 212. Memory 206 stores program instructions that when executed by processor 204 implement a message queue (MQ) conversion module 207 and an MQ service 122. MQ conversion module 207 includes an MQ transform module 208 and an MQ infrastructure build engine 210. Data storage 212 stores MQ policy 214, MQ mapping information 216 and one or more message queue instances 126. Network interface 202 is configured for both sending and receiving of data and control information within a network. In an embodiment, network interface 202 comprises multiple interfaces and can accommodate multiple communications protocols and control protocols. Memory 206 includes a plurality of memory locations addressable by processor 204 for storing program instructions and data used in program execution. As such, memory 206 may be implemented using any combination of volatile or non-volatile memory, including random-access memory (RAM) and read-only memory (ROM). In an embodiment, memory 206 is system memory for processor 204. Data storage 212 includes one or more integrated or peripheral mass storage devices, such as magnetic disks, optical disks, solid state drives or flash drives. In other embodiments, or at other times during operation of the embodiment of FIG. 2, some or all of the instructions shown in memory 206 may be stored in data storage 212, and some or all of the data shown in data storage 212 may be stored in memory 206.

MQ transform module 208 is configured to identify current MQ object instances and/or MQ properties associated with an application to be migrated from an current MQ service to a target MQ service, and map the object instance and property identifiers for the current MQ service to object instance and property identifiers for the target MQ service. Message queue objects, or MQ objects, as used herein refers to components of a message queue service including, but not limited to, message queue managers, message queues, message queue topics, and message queue channels. MQ object instances, as noted above, are concrete occurrences of these objects. Properties of an MQ service, or MQ properties, as used herein refer to attributes of a connection between a sender and a receiver of an MQ message and may include, without limitation, host names, port identifiers, names of the sending and receiving applications, and login information such as user IDs and passwords. Properties may also include identifiers of MQ object instances, such that "MQ object instances" and "MQ properties" are not necessarily mutually exclusive categories. MQ properties may also be referred to as "MQ details" herein. Embodiments of MQ transform module 208 include instructions executable to perform the identification and mapping recited above. In further embodiments, instructions in module 208 are executable to read one or more configuration or input files associated with the current MQ service as part of identifying the current MQ object instances and/or MQ properties. Instructions in module 208 are also executable to access MQ policy data and user-provided mapping data as a part of mapping the object instance and property identifiers for the current MQ service to object instance and property identifiers for the target MQ service.

MQ infrastructure build engine 210 of FIG. 2 is configured to generate instructions for creation of the target message queue object instances identified by the mapping process of MQ transform module 208. Build engine 210 is further configured to submit the instructions for creation of the target message queue object instances to the target MQ service for execution, in response to receiving a request for execution of the generated instructions. In an embodiment, build engine 210 is further configured to manage installation of the MQ object instances created by the target MQ service, and to store the properties of the new MQ service implementation for the application.

MQ policy 214, shown within data storage 212 of message queue service conversion device 200, includes information about how the MQ services handled by conversion device 200 are configured. In an embodiment, MQ policy 214 is stored in one or more databases. Information included in MQ policy 214 can include a listing of the MQ objects made available by an MQ service, and the parameters needed to specify those objects, for each of multiple MQ services. In a further embodiment, MQ policy 214 includes one or more associations or mappings between MQ objects, or groups of objects, made available by one MQ service and objects made available by a different MQ service. Using MQ policy 214, MQ transform module 208 can determine which MQ objects from a target MQ service are needed to replace the MQ objects in a current MQ service.

For a given object in one MQ service, the type and number of objects in another MQ service depends on the sequence of objects used by each MQ service to form a connection between a sending application (also referred to as a "publisher") and a receiving application (also referred to as a "consumer"). In one embodiment of a connection between one publisher and one consumer formed with the IBM MQ service offered by International Business Machines Corporation, for example, a message can be published directly to a queue, and MQ objects used include a message queue manager, a server connection channel, and a message queue. By contrast, in one embodiment of a connection between one publisher and one consumer formed with the open source RabbitMQ service distributed by Pivotal Software, Inc., a message is published to an exchange, which routes the message to a queue. This implementation using the RabbitMQ service would not use a message queue manager object or channel object, but would use an exchange object. In one possible mapping of the objects in the embodiments described above, the queue object of the IBM MQ embodiment could be mapped to the queue object of the RabbitMQ embodiment, while the queue manager and channel objects of the IBM MQ embodiment are mapped to (i.e., replaced by) the exchange object of the RabbitMQ embodiment. This simple example is to illustrate the kind of information included in MQ policy 214 of FIG. 2, and does not include all of the MQ objects and MQ properties included in a connection.

Another factor affecting the mapping of objects from one MQ service to another is than an MQ service may support multiple configurations of a connection. For example, a single exchange object instance in RabbitMQ can be configured to provide connections including a one-to-one connection between one publisher and one consumer (using one queue object instance), a one-to-many connection between one publisher and multiple consumers (using multiple queue object instances, one for each consumer), a many-to-one connection between multiple publishers and one consumer (using one queue object instance), and a many-to-many connection between multiple publishers and multiple consumers (using multiple queue object instances, one for each consumer). These configurations may also be referred to as "integration patterns." In an embodiment, MQ policy 214 includes the MQ objects and MQ properties needed for all configurations supported for an MQ service.

MQ mapping information 216 includes information about how the MQ object instances needed for a target MQ service implementation are to be configured. In the embodiment of FIG. 2, MQ policy 214 includes information on the objects to be used in implementing a given message queue service, but not on the particular instances of those objects to be created. The information needed for instances, such as queue names or which configuration or integration pattern is to be used for a connection in the new MQ service, is included in MQ mapping information 216. At least a portion of the MQ mapping information 216 is obtained automatically by MQ transform module 208 when it scans a configuration file of the current MQ service to obtain names of MQ object instances and properties. In an embodiment, additional information is obtained from user input. User input can include, for example, whether any of the object instance names that were obtained automatically should be changed for the target MQ implementation. A choice of configuration for a connection may also be input by a user in some embodiments, particularly if the target MQ offers more connection configuration options than the current MQ. In an embodiment, MQ mapping information 216 is stored in one or more databases. In a further embodiment, some or all of MQ mapping information 216 is stored in a common database or other data structure with some or all of MQ policy 214.

In the embodiment of FIG. 2, message queue service conversion device 200 includes MQ service 122 and message queue instance 126 in addition to the modules and data discussed above for conversion from one MQ service to another. In other embodiments, conversion device 200 may host applications implementing multiple MQ services 122 offered by different providers, along with the message queue instances handled by those MQ services. Alternatively, the MQ services and message queue instances could be hosted on devices separate from message service conversion device 200. Further alternatives and variations will be apparent to one of ordinary skill in the art in view of this disclosure. For example, embodiments of a message queue service device provided herein may include additional components not shown, such as one or more of the components discussed below in connection with FIG. 6. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program.

Figure 3:
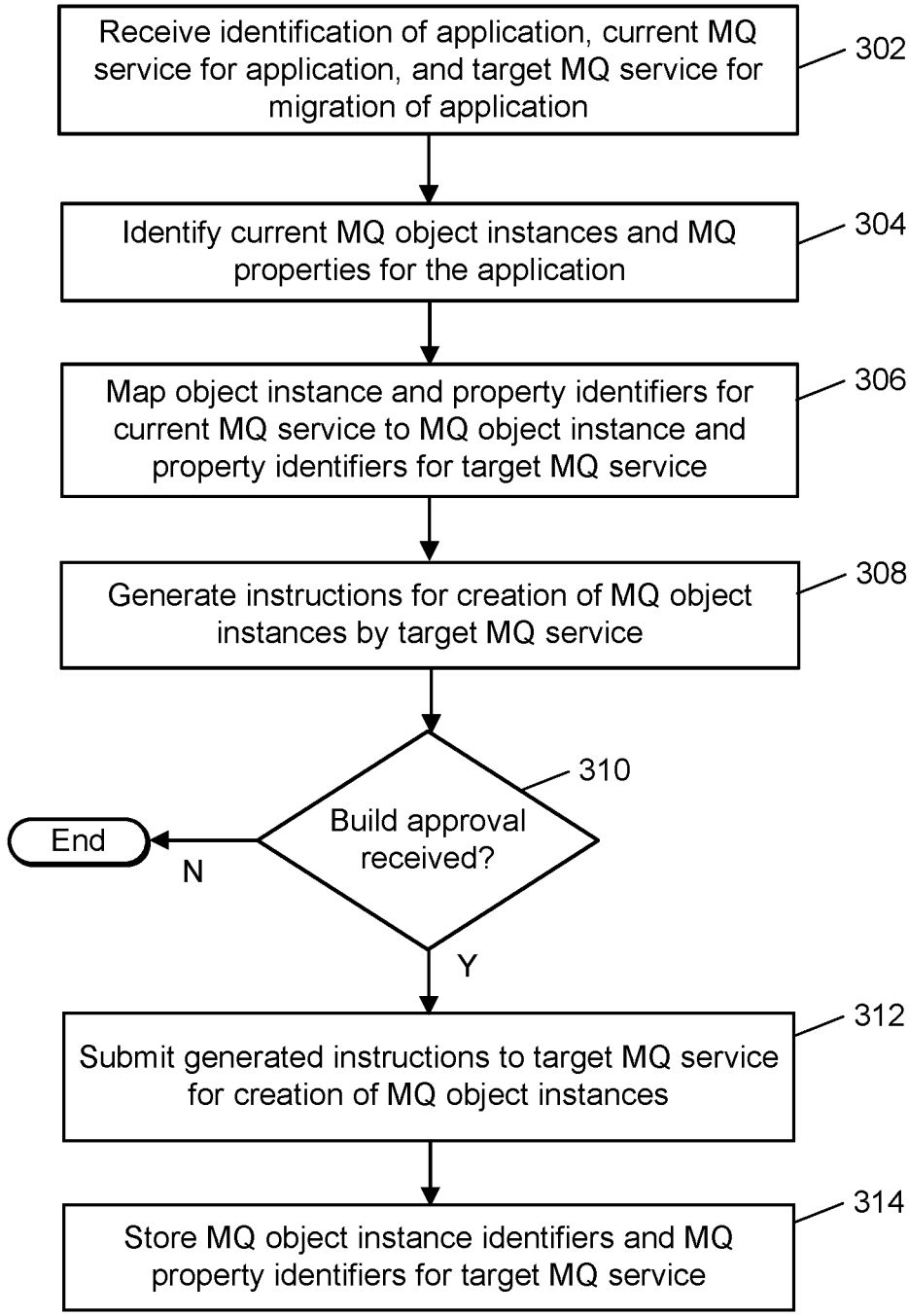
FIG. 3 is a flow chart illustrating an embodiment of a method for creating message queue service infrastructure for a conversion from one message queue service to another.

A flow chart illustrating an embodiment of a method for creating message queue service infrastructure for a conversion from one message queue service to another is shown in FIG. 3. Method 300 of FIG. 3 is an embodiment of a method performed by an MQ conversion module such as module 207 of FIG. 2. The method begins in step 302 with receiving identification of an application, a current MQ service for an application, and a target MQ service that the application is being migrated to. In an embodiment, the application, current MQ service and target MQ service are identified by a user of an application program implementing method 300. In a further embodiment, the user is a developer of or administrator for the application program being migrated to a different MQ service.

Method 300 continues in step 304 with identifying current MQ object instances and MQ properties for the application being migrated. The current MQ object instances and properties are identified by reading or scanning a configuration file for the application's current MQ implementation. The configuration file may also be referred to as an "inventory." In an embodiment, the configuration file is associated with an application program interface (API) mediating between the application program and the current MQ.

In some embodiments, an additional step (not shown) is performed of obtaining further information on MQ object instances and properties from a user of the application implementing the method. This further information may include desired names for queues or other MQ objects in the target MQ service implementation, if the user wants the implementation with the target MQ service to use different names for queues or other objects than the names used by the current MQ service. The user-supplied information may also include identification of an integration pattern (such as one-to-many or one-to-one) for use in the target MQ implementation. If the target MQ service implementation includes additional objects not present in the current MQ service implementation, additional user-supplied information may include selection of names for such objects. In an embodiment, additional information regarding target MQ objects and properties is stored as part of MQ mapping information like MQ mapping information 216 of FIG. 2.

In step 306 of method 300, the identifiers of MQ object instances and MQ properties for the current MQ service obtained in step 304 are mapped to MQ object instance and property identifiers for the target MQ service. In an embodiment of method 300 performed using conversion device 200 of FIG. 2, step 306 is performed by MQ transform module 208. Because the MQ objects used in the target MQ service are not necessarily the same types of objects used in the current MQ service, the mapping of identifiers is not necessarily a one-to-one correspondence. The mapping of step 306 converts the set of identifiers for MQ objects and properties used in the current MQ service implementation to a corresponding set of identifiers used in the target MQ service implementation. The mapping of step 306 uses MQ policy information such as MQ policy 214 of FIG. 2 and MQ mapping information such as mapping information 216 of FIG. 2.

The MQ object instance and property identifiers for the target MQ service, as determined by the mapping of step 306, are used in step 308 to generate instructions for creation of MQ object instances by the target MQ service. In an embodiment of method 300 performed using conversion device 200 of FIG. 2, step 308 is performed by MQ infrastructure build engine 210. In addition to having differences in MQ objects and properties used, different MQ services use different formats for instructions. In an embodiment of a message queue service conversion device, instruction format information for the MQ services handled by the conversion device is included in an MQ policy data store such as MQ policy 214 of FIG. 2.

To illustrate the format of instructions generated according to step 308 of method 300, example instructions for establishing queues in the IBM MQ service are as follows:
DEF QL(QL.SAMPLE.QUEUE.APP1) MAXDEPTH (5000) MAXMSGL(4194304) CLUSTER(HOST1) BOQNAME(QL.SAMPLE.QUEUE_BOQ. APP1) BOTHRESH(3)
DEF QL(QL.SAMPLE.QUEUE_BOQ.APP1)

Example instructions for establishing queues in the RabbitMQ service are as follows:
./rabbitmqadmin declare queue - -vhost=VRT.HST.1.VPM - -user=rmqadmin - -password=***** name=Q.SAMPLE.QUEUE durable=true
./rabbitmqadmin declare queue - -vhost=VRT.HST.1.VPM - -user=rmqadmin - -password=***** name=Q.SAMPLE.QUEUE_BOQ durable=true Each of the above pairs of instructions directs that a queue and a corresponding backout queue be created. In this example, the queue is named "Q.SAMPLE.QUEUE" and the backout queue is named "Q.SAMPLE.QUEUE_BOQ". (A backout queue is a queue for storing messages from the main queue which cannot be processed upon arrival at the receiving application. After being placed back onto the main queue a threshold number of times, the failed message can instead be put into the backup queue.) It can be seen from the above examples that the formats and parameters used in instructions for creating queues are quite different between these two MQ services. For example, the IBM MQ service uses a maximum queue depth and a maximum message length in the queue creation instruction, while the RabbitMQ service does not. The IBM MQ also appends an identifier of the receiving application ("APP1") to the end of the queue name. The RabbitMQ instruction includes a username and password, as well as the name of a virtual host. Although sample instructions for the IBM MQ and RabbitMQ services are shown here, the methods and systems disclosed herein can be configured to convert to or from other MQ services as well.

Method 300 continues in decision step 310 with determining whether a build approval for the generated instructions has been received. In an embodiment, the generated instructions are displayed on a display screen of a user device, and approval for "building" the queues is given by a user through a user interface displayed on the screen, such as a selectable area or "button" that can be pointed to with an input device such as a mouse or touchpad and selected by actuating a selection button on the input device. If the build approval is not received ("N" branch of step 310), the method ends. In an embodiment, the user ends the method by exiting the application program implementing the method if a decision is made not to proceed with the build. If build approval is received ("Y" branch of step 310), the generated instructions are submitted to the target MQ service for creation of the MQ object instances (step 312). The object instance identifiers and property identifiers for the target MQ service are stored, in step 314 of method 300. This storage may be performed by build engine 210 or transform module 208. In an embodiment, this information is stored as part of MQ mapping information 216 in conversion device 200 of FIG. 2. The MQ object instance and property identifiers may also be stored in a configuration file for the target MQ service similar to the configuration file for the current MQ service read in connection with step 304 of method 300. Such a configuration file may be stored in a data store associated with an API mediating between the application program being migrated and the target MQ service.

Figure 4:
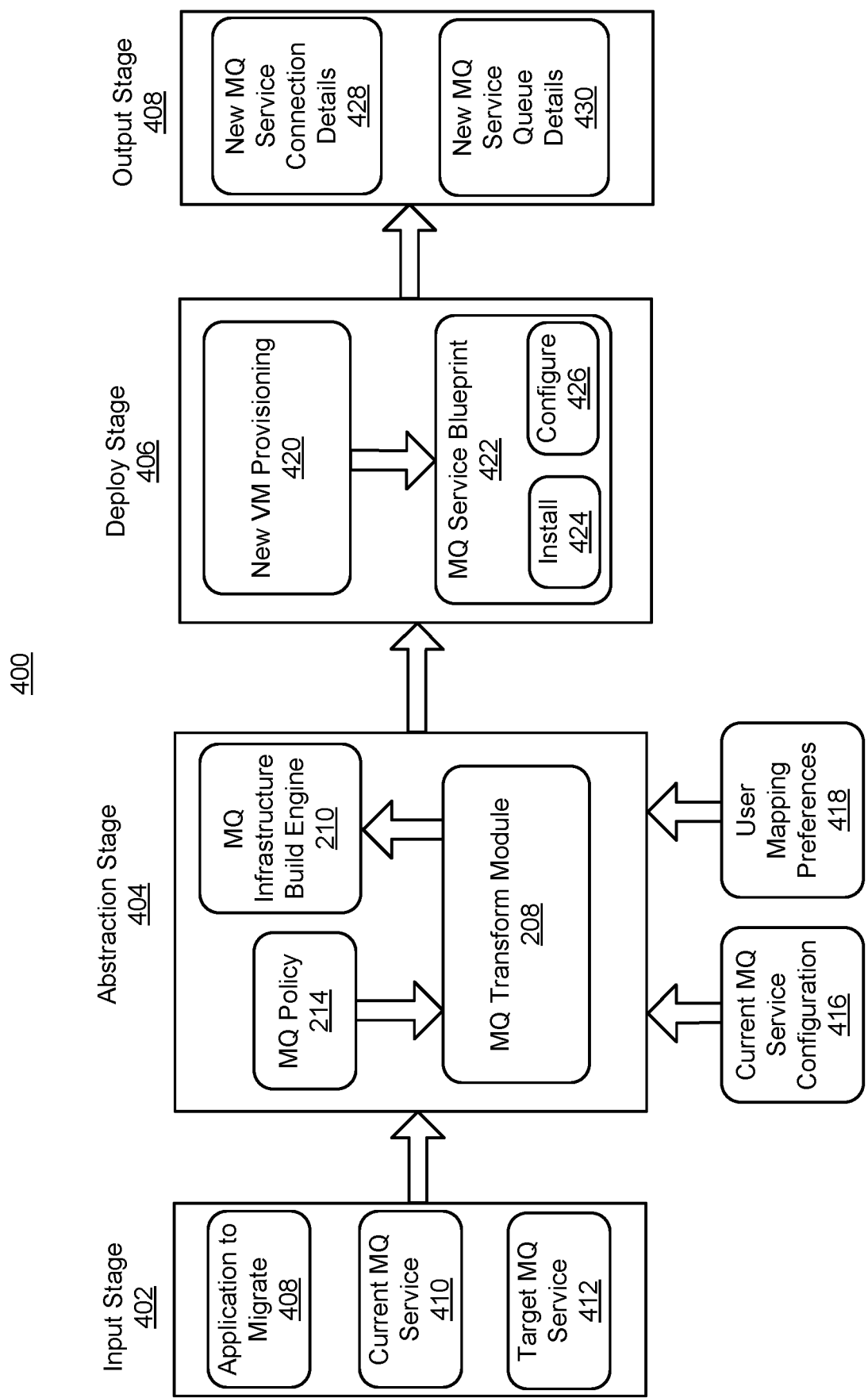
FIG. 4 illustrates an embodiment of an architecture of a message queue service conversion application.

Method 300 described above illustrates what can be considered a build phase of a conversion from one MQ service to another. A broader view of an application for conversion between MQ services is illustrated by the architecture or code flow diagram of FIG. 4. In the embodiment of FIG. 4, application 400 is hosted and executed by message queue service conversion device 200 of FIG. 2. Input stage 402 of application 400 illustrates input of the identities (names) of an application to migrate 408, a current MQ service 410 and a target MQ service 412. Input of this information to abstraction stage 404 corresponds to step 302 of method 300 in FIG. 3.

Abstraction stage 404 of application 400 involves MQ transform module 208 and MQ infrastructure build engine 210, which are described above in connection with the discussion of FIG. 2. Using current MQ service configuration 416, MQ transform module 208 identifies the MQ object instances and MQ properties of the current MQ service implementation for application 408. In an embodiment, current MQ service configuration 416 is stored in a configuration file or inventory for the current MQ service as it relates to application 408. In a further embodiment, the configuration file is associated with an API connecting application 408 to the current MQ service. Using MQ policy 214 and user mapping preferences 418, MQ transform module 208 maps the MQ object instances and properties of the current MQ service configuration to a set of MQ object instances and properties of the target MQ configuration. In an embodiment, user mapping preferences 418 includes desired names for queues or other MQ objects in the target MQ service implementation, if the user wants the implementation with the target MQ service to use different names for queues or other objects than the names used by the current MQ service. Preferences 418 may also include identification of an integration pattern (such as one-to-many or one-to-one) for use in the target MQ implementation. If the target MQ service implementation includes additional objects not present in the current MQ service implementation, preferences 418 may include selection of names for such objects. Operations carried out by MQ transform module 208 in abstraction stage 404 of application 400 generally correspond to steps 304 and 306 of method 300 in FIG. 3.

MQ infrastructure build engine 210 uses the MQ object instance identifiers and MQ property identifiers produced by MQ transform module 208 for the target MQ service to generate instructions for creation of the identified MQ object instances by the target MQ service. When approval for building of the MQ objects is received, build engine 210 submits the generated instructions to the target MQ for creation of the MQ objects. These operations corresponds to steps 308 through 312 of method 300.

The operation of abstraction stage 404 enables application 400 to present a "one-click" build option to a user of the application. When build engine 210 has generated the instructions for creating the MQ object instances for the target MQ service, a user interface button can be displayed along with the generated instructions, where "clicking" the user interface button causes the instructions to be submitted to the target MQ service for creation of the MQ object instances. In a similar manner, application 400 is configured to present a one-click "promote" option to the user. Selection by the user of a "promote" user interface button causes the created MQ object instances to be installed in a virtual machine and the MQ service connections to be configured for deployment into operation of application 408. Application 400 automatically manages the checking in to the organization's code repository of the various versions of code created for the target MQ service implementation.

When promote approval is received, the code flow of application 400 moves to deploy stage 406. A virtual machine provisioning module 420 allocates resources for a virtual machine to host the MQ object instances for the target MQ service. The allocated resources may include memory, data storage, processor resources and other resources as appropriate. MQ service blueprint module 422 includes an install module 424 and a configure module 426. These modules manage installation of the target MQ object instances in the new virtual machine, and configuration of the connections between application 408 and one or more applications to be communicated with using the target message queue service. Output from application 400, shown at output stage 408 of the diagram of FIG. 4, includes MQ service connection details 428 and MQ service queue details 430 for the target MQ service, which has become the new MQ service by virtue of the deployment illustrated by stage 406. In an embodiment, details 428 and 430 are in the form of XML files. Such files may be stored for use by the new MQ service and by application 408 and/or an API used by application 408.

Figure 5:
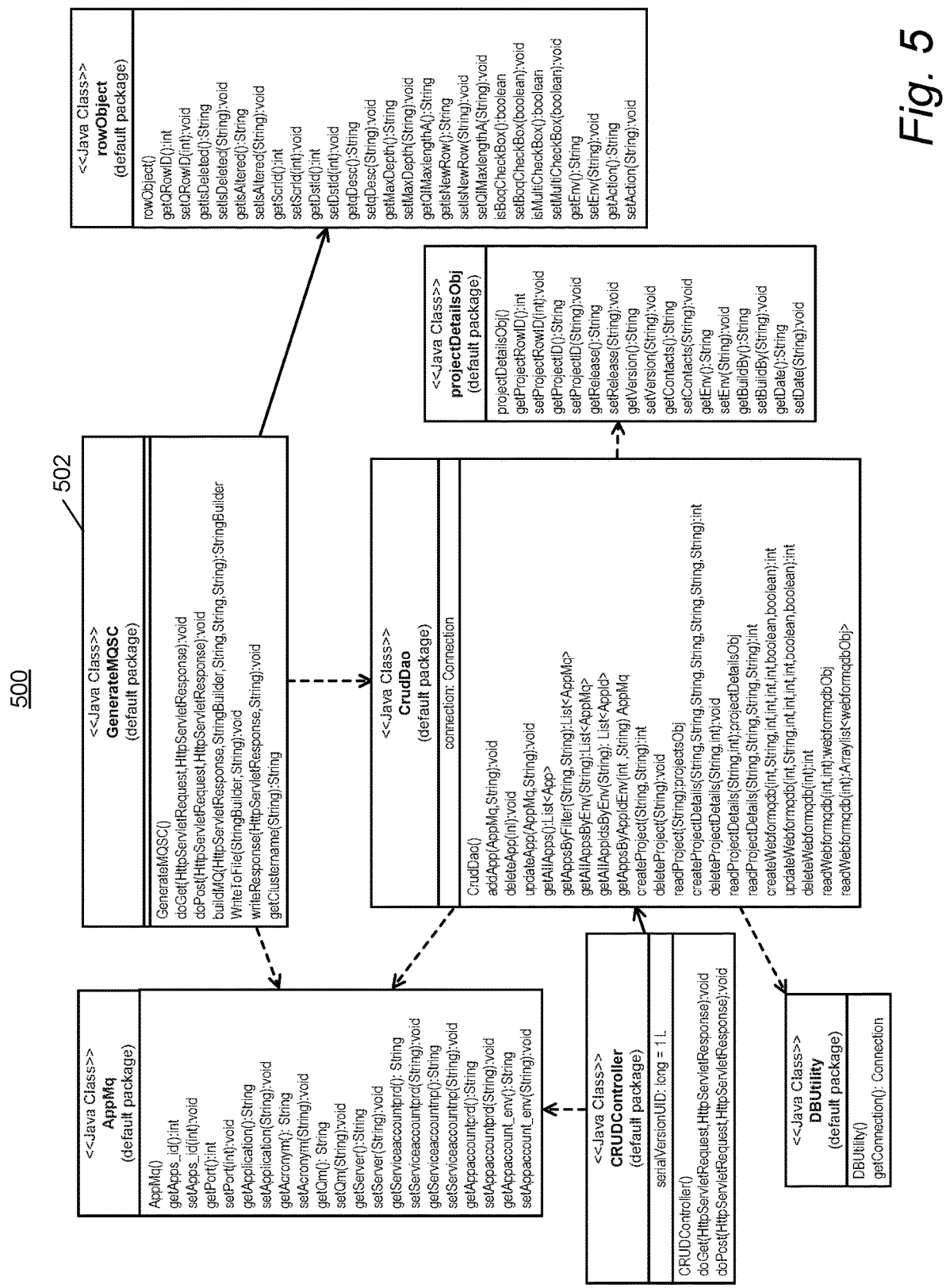
FIG. 5 is a class diagram illustrating the structure of an application implementing a message queue service conversion system.

A class diagram 500 illustrating the structure of an implementation of an application for converting from one MQ service to another is shown in FIG. 5. Class 502, named GenerateMQSC in the embodiment of FIG. 5, includes the interfaces required to perform functions of an MQ infrastructure build engine such as engine 210 of FIGS. 2 and 4. As an example, code that may be used to build the target MQ service object instances is provided below:

```
MQPCFAgent mqAgent=new MQPCFAgent(qmgr, host-
    name, Integer.parsInt(port), "MW_MQ_S_ADMIN");
writeResponse(response,mqAgent.mqscResponses);
responseSB.append(mqAgent.mqscResponses+"\n\n");
String[ ] lines=qmgrMqsc.toString( ).split("\\n");
for(String cmd: lines)
{
    if(! (cmd.trim( ).startsWith("*")))
    {
        System.out.println("\nExecuting:"+cmd);
        response.getWriter( )println("Executing:"+cmd);
        responseSB.append("\nExecuting:"+cmd+"\n");
        mqscResponse=mqAgent.RunMQSCCommand
            (cmd);
        responseSB.append(cmd+"\n"+mqscResponse+
            "\n\n");
        System.out.println("Response:"+mqscResponse);
        writeResponse(response,mqAgent.mqscResponses);
    }
}
mqAgent.Close( );
```

The methods, systems and program instructions disclosed herein for converting from one message queue service to another enable improvements to the technology of distributed application operation. By automatically generating the commands needed to create components of the target message queue service, the disclosed methods, systems and instructions are expected to minimize errors in implementing a new message queue service and reduce the number of code versions required. Because of the inherently interconnected nature of distributed applications employing message queues, any errors in message queue implementation can propagate throughout the network of computers running the distributed applications. A failure in message delivery anywhere in the system will slow the operation of applications waiting for messages and overload the memory and data storage of applications unable to send messages. By reducing the chances of any message delivery failure, the disclosed embodiments result in improvement in the performance of the entire distributed application network.

Figure 6:
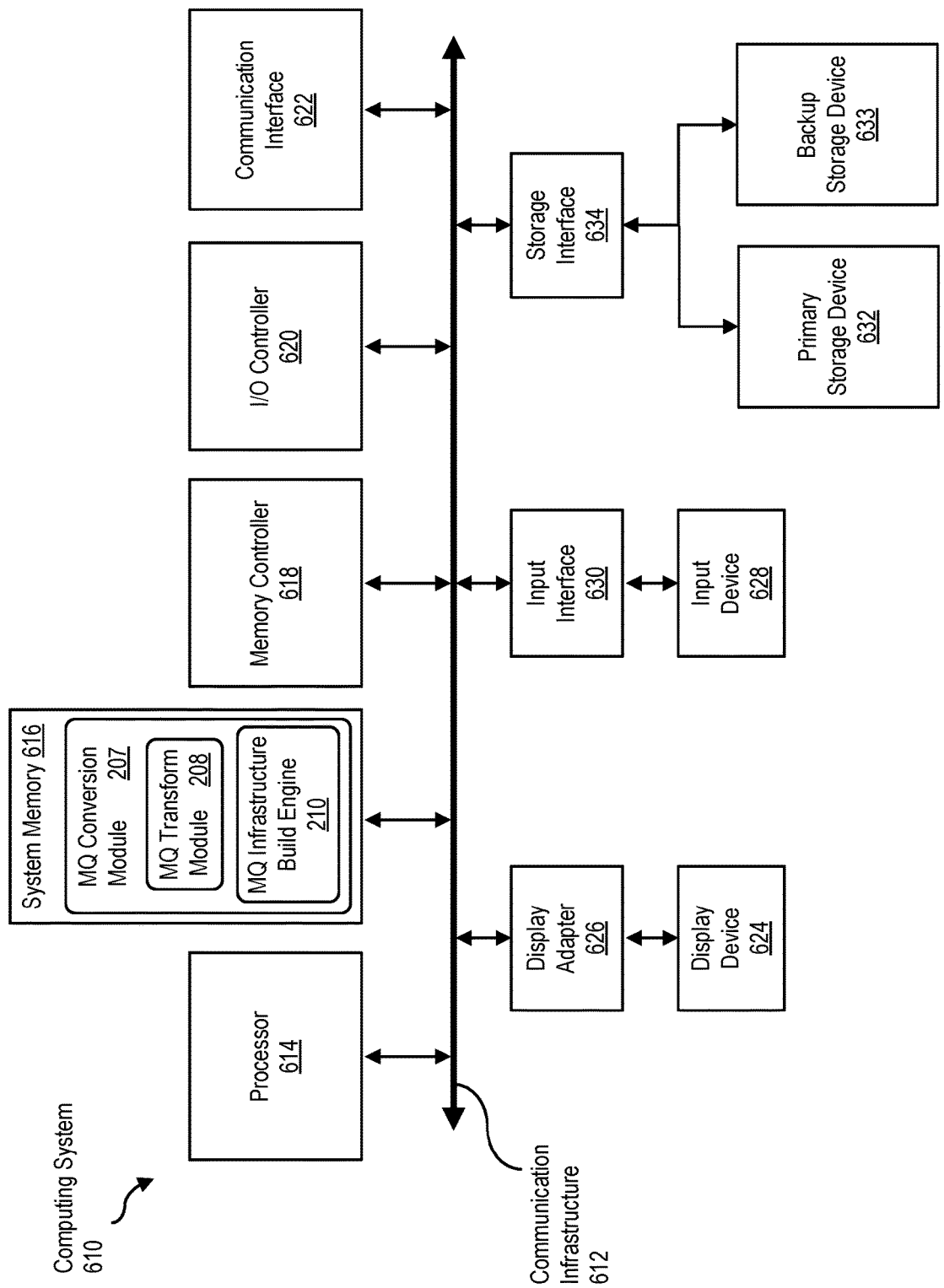
FIG. 6 is a block diagram illustrating an embodiment of an information handling system.

FIG. 6 depicts a block diagram of an information handling system 610 suitable for implementing aspects of the systems described herein. In the embodiment of FIG. 6, computing system 610 implements a message queue service conversion device such as device 200 of FIG. 2. Embodiments of the computing system of FIG. 6 can, alternatively or in addition, implement various other engines and modules described in this disclosure. Computing system 610 broadly represents any single or multi-processor computing device or system capable of executing computer-readable instructions. Examples of computing system 610 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 610 may include at least one processor 614 and a system memory 616. By executing the software that implements message queue conversion module 207, computing system 610 becomes a special purpose computing device that is configured to perform message forwarding in manners described elsewhere in this disclosure.

Processor 614 generally represents any type or form of processing unit capable of processing data or interpreting and executing instructions. In certain embodiments, processor 614 may receive instructions from a software application or module. These instructions may cause processor 614 to perform the functions of one or more of the embodiments described and/or illustrated herein. System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 610 may include both a volatile memory unit (such as, for example, system memory 616) and a non-volatile storage device (such as, for example, primary storage device 632, as described further below). In one example, program instructions executable to implement a forwarding engine configured to forward messages using bit indexed explicit replication (BIER) may be loaded into system memory 616.

In certain embodiments, computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the operations or features described and/or illustrated herein. I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 610 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer) for display on display device 624. Computing system 610 may also include at least one input device 628 coupled to communication infrastructure 612 via an input interface 630. Input device 628 generally represents any type or form of input device capable of providing input, either computer or human generated, to computing system 610. Examples of input device 628 include, without limitation, a keyboard, a pointing device, a speech recognition device, or any other input device.

As illustrated in FIG. 6, computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may include a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. A storage device like primary storage device 632 can store information such as routing tables and forwarding tables.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may be a part of computing system 610 or may in some embodiments be separate devices accessed through other interface systems. Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6.

Computing system 610 may also employ any number of software, firmware, and/or hardware configurations. For example, one or more of the embodiments disclosed herein may be encoded as a computer program (also referred to as computer software, software applications, computer-readable instructions, or computer control logic) on a non-transitory computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 610 for storage in memory via a network such as the Internet or upon a carrier medium. The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the embodiments described and/or illustrated herein. Additionally or alternatively, one or more of the embodiments described and/or illustrated herein may be implemented in firmware and/or hardware. For example, computing system 610 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the methods and systems disclosed herein have been described in connection with several embodiments, they are not intended to be limited to the specific forms set forth herein. On the contrary, the disclosure is intended to cover such alternatives, modifications, and equivalents as can be reasonably included within the scope of the invention as defined by the appended claims.

What is claimed is:

1. A computer-implemented method, comprising:
receiving identification of an application program, identification of a current message queue service employed by the application program, and identification of a target message queue service to be employed by the application program instead of the current message queue service;
identifying current message queue object instances for the application program;
mapping identifiers of the current message queue object instances to identifiers of target message queue object instances for use with the target message queue service;
generating instructions for creation of the target message queue object instances by the target message queue service; and
in response to receiving a request for execution of the generated instructions, submitting the generated instructions to a message queue program implementing the target message queue service.

2. The computer-implemented method of claim 1, wherein identifying the current message queue object instances comprises reading a configuration file for the current message queue service.

3. The computer-implemented method of claim 1, wherein mapping the identifiers of the current message queue object instances to identifiers of target message queue object instances comprises incorporating received user preferences regarding names or configurations of target message queue object instances.

4. The computer-implemented method of claim 1, wherein receiving identification of the application program, identification of the current message queue service and identification of the target message queue service comprises receiving the identifications via a user interface of a user device.

5. The computer-implemented method of claim 1, further comprising displaying the generated instructions on a display of a user device via a user interface, and wherein receiving the request for execution of the generated instructions comprises receiving the request via the user interface.

6. The computer-implemented method of claim 1, further comprising storing the identifiers of the target message queue object instances.

7. The computer-implemented method of claim 1, further comprising:
identifying properties of one or more of the current message queue object instances, wherein the properties comprise an identifier of a current host computer storing the one or more of the current message queue object instances;
mapping the identified properties to properties of one or more of the target message queue object instances, wherein the properties comprise an identifier of a target host computer for storing one or more of the target message queue object instances; and
installing at the target host computer one or more of the target message queue object instances.

8. An information handling system comprising:
one or more processors;
a non-transitory computer-readable storage medium coupled to the one or more processors; and
a plurality of instructions, encoded in the computer-readable storage medium and configured to cause the one or more processors to
receive identification of an application program, identification of a current message queue service employed by the application program, and identification of a target message queue service to be employed by the application program instead of the current message queue service,
identify current message queue object instances for the application program,
map identifiers of the current message queue object instances to identifiers of target message queue object instances for use with the target message queue service,
generate instructions for creation of the target message queue object instances by the target message queue service, and
in response to receiving a request for execution of the generated instructions, submit the generated instructions to a message queue program implementing the target message queue service.

9. The information handling system of claim 8, wherein the plurality of instructions is further configured to cause the one or more processors to read a configuration file associated with the current message queue service, as a part of identifying the current message queue object instances.

10. The information handling system of claim 8, wherein the plurality of instructions is further configured to cause the one or more processors to incorporate received user preferences regarding name or configurations of target message queue object instances, as a part of mapping the identifiers of the current message queue object instances to identifiers of target message queue object instances.

11. The information handling system of claim 8, wherein the plurality of instructions is further configured to cause the one or more processors to receive identification of the application program, identification of the current message queue service and identification of the target message queue service via a user interface of a user device.

12. The information handling system of claim 8, wherein the plurality of instructions is further configured to cause the one or more processors to:
display the generated instructions on a display of a user device via a user interface; and
receive the request for execution of the generated instructions via the user interface.

13. The information handling system of claim 8, wherein the plurality of instructions is further configured to cause the one or more processors to store the identifiers of the target message queue object instances.

14. The information handling system of claim 8, wherein the plurality of instructions is further configured to cause the one or more processors to:
identify properties of one or more of the current message queue object instances, wherein the properties comprise a current host computer storing one or more of the current message queue object instances;
map the identified properties to properties of one or more of the target message queue object instances, wherein the properties comprise a target host computer for storing one or more of the target message queue object instances; and
install at the target host computer one or more of the target message queue object instances.

15. A non-transitory computer readable storage medium having program instructions encoded therein, wherein the program instructions, when executed by a computer system, are configured to:
receive identification of an application program, identification of an current message queue service employed by the application program, and identification of a target message queue service to be employed by the application program instead of the current message queue service;
identify current message queue object instances for the application program;
map identifiers of the current message queue object instances to identifiers of target message queue object instances for use with the target message queue service;
generate instructions for creation of the target message queue object instances by the target message queue service; and
in response to receiving a request for execution of the generated instructions, submit the generated instructions to a message queue program implementing the target message queue service.

16. The non-transitory computer readable storage medium of claim 15, wherein the program instructions, when executed by a computer system, are further configured to read a configuration file associated with the current message queue service, as a part of identifying the current message queue object instances.

17. The non-transitory computer readable storage medium of claim 15, wherein the program instructions, when executed by a computer system, are further configured to incorporate received user preferences regarding name or configurations of target message queue object instances, as a part of mapping the identifiers of the current message queue object instances to identifiers of target message queue object instances.

18. The non-transitory computer readable storage medium of claim 15, wherein the program instructions, when executed by a computer system, are further configured to:
    display the generated instructions on a display of a user device via a user interface; and
    receive the request for execution of the generated instructions via the user interface.

19. The non-transitory computer readable storage medium of claim 15, wherein the program instructions, when executed by a computer system, are further configured store the identifiers of the target message queue object instances.

20. The non-transitory computer readable storage medium of claim 15, wherein the program instructions, when executed by a computer system, are further configured to:
    identify properties of one or more of the current message queue object instances, wherein the properties comprise an identifier of a current host computer storing the one or more of the current message queue object instances;
    map the identified properties to properties of one or more of the target message queue object instances, wherein the properties comprise an identifier of a target host computer for storing one or more of the target message queue object instances; and
    install at the target host computer one or more of the target message queue object instances.

* * * * *

UNITED STATES PATENT AND TRADEMARK OFFICE
CERTIFICATE OF CORRECTION

| | | |
|---|---|---|
| PATENT NO. | : 10,579,449 B1 | Page 1 of 1 |
| APPLICATION NO. | : 16/179386 | |
| DATED | : March 3, 2020 | |
| INVENTOR(S) | : Hung T. Dinh et al. | |

It is certified that error appears in the above-identified patent and that said Letters Patent is hereby corrected as shown below:

In the Claims

Column 18, Lines 1-4 should read:
19. The non-transitory computer readable storage medium of claim 15, wherein the program instructions, when executed by a computer system, are further configured to store the identifiers of the target message queue object instances.

Signed and Sealed this
Fifth Day of May, 2020

Andrei Iancu
*Director of the United States Patent and Trademark Office*